(12) United States Patent
Zhou et al.

(10) Patent No.: US 10,812,196 B2
(45) Date of Patent: Oct. 20, 2020

(54) OPTICAL EQUALIZATION METHOD FOR DIRECT DETECTION OPTICAL COMMUNICATION SYSTEMS

(71) Applicant: Google LLC, Mountain View, CA (US)

(72) Inventors: Xiang Zhou, Sunnyvale, CA (US); Lieven Verslegers, San Mateo, CA (US); Hong Liu, Palo Alto, CA (US); Ryohei Urata, San Carlos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/358,200

(22) Filed: Mar. 19, 2019

(65) Prior Publication Data

US 2020/0162165 A1    May 21, 2020

Related U.S. Application Data

(60) Provisional application No. 62/770,007, filed on Nov. 20, 2018.

(51) Int. Cl.
*H04L 25/03* (2006.01)
*H04B 10/516* (2013.01)

(52) U.S. Cl.
CPC ..... *H04B 10/516* (2013.01); *H04L 25/03261* (2013.01); *H04L 25/03343* (2013.01)

(58) Field of Classification Search
CPC .......... H04B 10/2507; H04B 10/25073; H04B 10/6972; H04J 14/06
See application file for complete search history.

(56) References Cited

U.S. PATENT DOCUMENTS

| 7,844,186 B2 | 11/2010 | Dorrer et al. |
| 10,274,681 B1* | 4/2019 | Karimelahi ....... H04L 25/03885 |
| 2017/0170903 A1* | 6/2017 | Jain .................. H04B 10/25752 |

(Continued)

FOREIGN PATENT DOCUMENTS

| JP | H05323243 A | 12/1993 |
| WO | 2004008202 A2 | 1/2004 |
| WO | 2005013519 A1 | 2/2005 |

OTHER PUBLICATIONS

International Search Report and Written Opinion for International Application No. PCT/US2019/060950 dated Feb. 27, 2020. 13 pages.

*Primary Examiner* — Dzung D Tran
(74) *Attorney, Agent, or Firm* — Lerner, David, Littenberg, Krumholz & Mentlik, LLP

(57) ABSTRACT

Systems and methods of transmitting direct detection optical signal are provided. A direct detection optical transmitter according to illustrative embodiments includes a Mach Zehnder Modulator (MZM) configured to modulate laser light based on an electrical drive signal to generate a modulated optical signal and a complementary-modulated optical signal. The optical transmitter includes an optical finite impulse response (FIR) filter configured to receive the complementary-modulated optical signal and generate a filtered optical signal. The optical transmitter includes a polarization rotator configured to receive the filtered optical signal and output a rotated optical signal. The optical transmitter includes an optical combiner configured to combine the modulated optical signal and the rotated optical signal. The optical transmitter includes an output port configured to output the combined optical signal.

20 Claims, 15 Drawing Sheets

(56) References Cited

U.S. PATENT DOCUMENTS

2017/0250776 A1* 8/2017 Morsy-Osman ..... H04B 10/532
2018/0269984 A1* 9/2018 Salsi ................ H04B 10/07957
2019/0342028 A1* 11/2019 He ....................... H04B 10/556

* cited by examiner

OPTICAL EQUALIZATION METHOD FOR DIRECT DETECTION OPTICAL COMMUNICATION SYSTEMS

CROSS REFERENCE TO RELATED APPLICATION

This application claims the benefit of U.S. Provisional Patent Application No. 62/770,007, filed Nov. 20, 2018, the entire contents and substance of which are incorporated by reference herein.

BACKGROUND

Computer network data centers consist of many interconnected computing devices such as servers, switches, routers, and gateways interconnected via electrical and optical links. Due to stringent power and cost requirements, the optical links tend to use direct detection techniques, especially for <100 m short-reach datacenter interconnects. The Mach Zehnder Modulator (MZM) is a widely used optical modulator for Silicon photonics-based short-reach direct-detection optical communication systems. The MZM has two output ports: one is the commonly-used output port where the intensity-modulated optical signal can be modeled as C1+I(t), and the other port has the complementarily-modulated optical signal output which can be modeled as C2−I(t). With typical quadrature MZM biasing, C1 and C2 are equal constants. For conventional direct detection communication systems, the complementary output port is not used.

SUMMARY

At least one aspect is directed to a direct detection optical transmitter. The optical transmitter includes a Mach Zehnder Modulator (MZM) configured to modulate laser light based on an electrical drive signal to generate a modulated optical signal and a complementary-modulated optical signal. The optical transmitter includes an optical finite impulse response (FIR) filter configured to receive the complementary-modulated optical signal and generate a filtered optical signal. The optical transmitter includes a polarization rotator configured to receive the filtered optical signal and output a rotated optical signal. The optical transmitter includes an optical combiner configured to combine the modulated optical signal and the rotated optical signal. The optical transmitter includes an output port configured to output the combined optical signal.

At least one aspect is directed to a method of transmitting a direct detection optical signal. The method includes modulating laser light based on an electrical drive signal to generate a modulated optical signal and a complementary-modulated optical signal. The method includes filtering the complementary-modulated optical signal using an optical finite impulse response (FIR) filter to generate a filtered optical signal. The method includes rotating the filtered optical signal to generate a rotated optical signal. The method includes combining the modulated optical signal and the rotated optical signal. The method includes outputting the combined optical signal.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
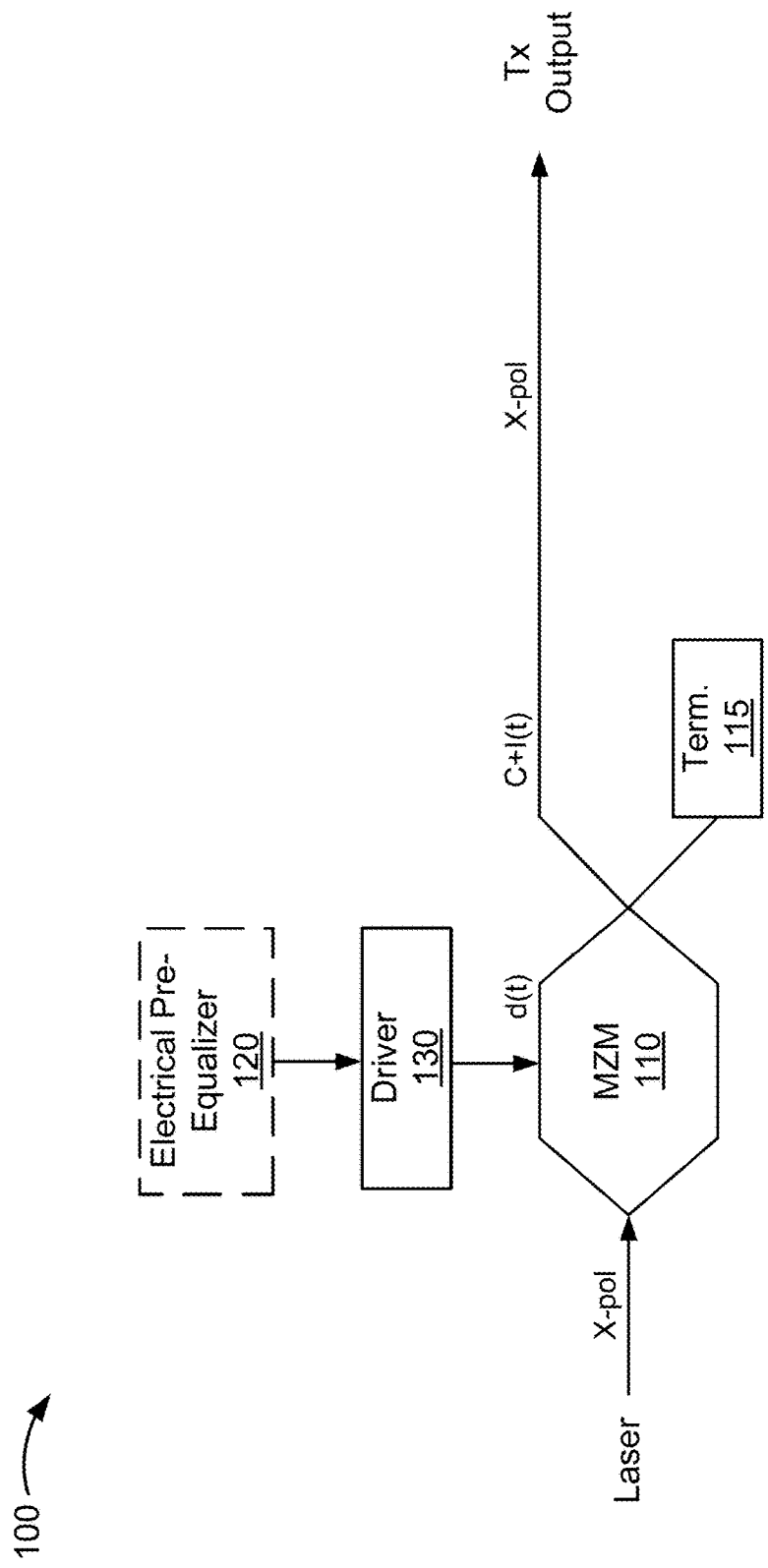
FIG. 1 is a block diagram of a conventional Mach Zehnder Modulator (MZM)-based transmitter for direct detection optical communication systems.

This disclosure relates generally to systems and methods for optical equalization for improving the bandwidth of direct detection optical communication systems. Systems and methods of this disclosure can enhance transmitter bandwidth by 1) introducing an optical finite impulse response (FIR) filter at the complementary signal output path of the Mach-Zehnder modulator (MZM), 2) rotating the state of polarization of the FIR-filtered complementary signal by 90-degrees, and 3) combining the orthogonally polarized complementary signal (Y-pol) and the original signal (X-pol) through a polarization combiner. This technique enables almost lossless transmitter bandwidth equalization (strictly lossless in theory) implemented in the optical domain because the delayed 'copies' of the original signal required for bandwidth equalization are obtained from the complementary signal path and combined through a polarization combiner. The proposed technique can achieve similar performance as electrical pre-equalization, but with lower power consumption (up to and over an order of magnitude lower). Accordingly, the proposed technique can be used to reduce the transmitter power by removing the need for Tx-side electrical pre-equalization. It could also be used along with conventional electrical pre-equalization techniques to improve the overall transmission performance for bandwidth-limited high-speed optical communication systems. Simulations have shown that >1.5 dB performance gain can be achieved for a bandwidth limited 112 GBaud PAM4 system.

The ever-growing bandwidth demands of computer networking and communications continue to drive the need for higher-speed optical interconnection networks. To scale the interconnection interface bandwidth beyond 400 Gb/s, both higher symbol rate (>50 Gbaud) and higher order modulation formats (PAM4 or higher) are needed. Because datacenter interconnection networks have very stringent power and cost requirements, direct (intensity) detection based techniques are still the default technology choice (at least in the foreseeable future), especially for the <100 m short-reach datacenter interconnects.

For these high-speed direct detect detection systems employing high symbol rate and high order modulation formats, however, limited optical and electrical component bandwidth have become the bottleneck to achieve the required link budget. So technologies that can enhance the overall transmission system bandwidth (and thus improved link budget) are critical to continue scaling datacenter networks.

The Mach Zehnder Modulator (MZM) is a widely used optical modulator for Silicon photonics based short reach direct detection optical communication systems. The MZM has two output ports: one is the commonly-used output port where the intensity-modulated optical signal can be modeled as C1+I(t), and the other port has the complementally-modulated optical signal output which can be modeled as C2−I(t). C1 and C2 are two constants equal to the continuous-wave optical power at the two MZM outputs when no data driving signal is applied to the MZM. With typical quadrature MZM biasing, C1=C2=C. For conventional direct detection communication systems, the complementary output port is not used.

One way to enhance the transmitter bandwidth is to boost the high frequency signal spectral components of the modulated optical signal by using a class of finite impulse response (FIR) filter based equalization techniques. But this approach presents two challenges. First, the conventional optical FIR filter will introduce significant signal loss because the original optical signal has to be split into multiple paths and then recombined by using multiple optical couplers. Second, the conventional delay-and-attenuation optical FIR filter does not work for direct detection system, since the signal is not modulated on the optical field.

For the proposed optical equalization technique, two new design concepts are introduced to address the above two challenges. First, the delay-and-attenuation FIR filter is implemented at the complementary signal path, not on the original signal path. Second, the FIR-filtered complementary signal is combined with the original optical signal through a polarization combiner after 90 degree polarization rotation. Since there is no fundamental loss introduced by the polarization combiner, the proposed optical equalization method is in theory a strictly lossless optical equalization technique, although for practical implementation, the polarization combiner may introduce a small (0.1 to 0.2 dB) excess insertion loss. Also because a polarization combiner performs an intensity sum operation, the proposed equalization technique is applicable for direct detection optical communication systems. In some implementations, the polarization rotator and the polarization combiner can be implemented as a single, integrated device.

In some implementations, the optical FIR filter implemented at the complementary signal path of the MZM can be a simple one-tap T-spaced FIR filter (with one tap delay relative to the original signal). In some implementations, the optical FIR filter can be a two-tap or three-tap T-spaced FIR filter. In some implementations, the tap delay may be greater or less than a symbol period T, although the symbol period delay is used in the examples discussed herein. In some implementations, the system can use a variable optical attenuator (VOA), which is an optical device that can introduce variable optical loss. The VOA can be implemented as an electrical-absorption modulation-based device or Mach Zehnder interference (MZI)-based device. MZI-based VOA devices may have lower intrinsic loss (in theory lossless) and also can provide an additional optical power monitoring port to help VOA loss control. Because the required power to control the VOA can be very low (less than 2 mW with silicon photonics based devices), the proposed optical equalization technique can have much lower power consumption than the conventional electrical equalization technique (up to and exceeding an order of magnitude lower). Moreover, the required power for optical equalization remains the same even as data rates are scaled higher, while electrical equalization requires more power for higher data rates.

In the case of a one-tap FIR filter, such as the one described below with reference to FIG. 3, the polarization combined optical intensity signal can be expressed as:

$$I_{xy}(t) = C + I(t) + aC - aI(t-T) \quad (1)$$
$$= (1+a)C + I(t) - aI(t-T)$$

where a denotes the (power) transmission coefficient of the VOA (i.e. the power coefficient of the FIR filter). One can see that the effective portion of $I_{xy}(t)$ is equivalent to the original signal after passing through a lossless two-tap high-frequency boosting linear equalizer. From Eq. 1, one can also see that the DC signal component has been increased from C to (1+a)C. The increased DC component will reduce the modulation extinction ratio (ER).

It has been found that modulation ER and optical modulation amplitude can be improved by introducing an additional zero-delay tap. A two-tap system, such as the one described below with reference to FIG. 4, will be used as an example to illustrate the principle. The complementary optical signal field at the output of the two-tap FIR filter (i.e. the output at OC2) can be given by Eq. 2 below:

$$Ec(t) = \sqrt{a_0(C-I(t))} - \sqrt{a_1(C-I(t-T))} \quad (2)$$

where $a_0$ and $a_1$ denote the (power) transmission coefficients of the upper (with VOA0) and lower path (with VOA1), respectively. Note that there is a pi phase difference between the upper and the lower path for this design. Assuming a relatively small MZM modulation depth, the polarization combined optical intensity signal can be expressed as:

$$I_{xy}(t) \approx (1+a_0+a_1-2\sqrt{a_0 a_1})C + (1-a_0+\sqrt{a_0 a_1})I(t) + (1-a_1+\sqrt{a_0 a_1})I(t-T) - \sqrt{a_0 a_1}I(t)I(t-T) \quad (3)$$

From Eq. 3, it can be seen that, the DC component can be reduced and the optical modulation amplitude (OMA) can be increased by having $a_0>0$ and $a_0<a_1$. Non-zero values of $a_0$, however, will introduce additional crosstalk (the last term of Eq. 3). Simulations have shown that, even with this additional crosstalk, introducing this zero-delay tap can still improve the overall performance for a bandwidth limited direct detection system.

FIG. 1 is a block diagram of a conventional MZM-based transmitter 100 for direct detection optical communication systems. The transmitter 100 uses a Mach-Zehnder modulator (MZM) 110 to modulate a laser light with an electrical drive signal from a driver 130. The driver 130 can be an electrical voltage, current, or power amplifier that can take the electrical signal to be transmitted and amplify it to a level suitable for modulating the MZM 110. The MZM 110 is based on a Mach-Zehnder interferometer. The MZM can modulate the amplitude of an optical wave. The MZM consists of an input waveguide that is split into two waveguides, which act as arms of an interferometer. When a voltage is applied across one of the arms, the affected arm applies a phase shift to the wave passing through it. When the arms are recombined, the phase difference between the two waves results in an amplitude modulation. The MZM has two outputs: a modulated output and a complementary-modulated output. In the conventional transmitter 100 of FIG. 1, the signal from complementary-modulated output is not used, and is in some cases simply fed into a terminal 115. Thus, 50%, or 3 dB of the optical power from the MZM 110 is simply discarded.

In some cases, electrical pre-equalization by an electrical pre-equalizer 120 can be used to boost high-frequency components of the electrical signal to be modulated onto the continuous-wave laser. Electrical pre-equalization, however, requires a lot of additional power, both in the equalization itself as well as in the amplification of the pre-equalized electrical signal by the driver 130. Furthermore, the power requirement of electrical pre-equalization scales with bit rate; that is, higher bit rates require more power for electrical pre-equalization.

Figure 2:
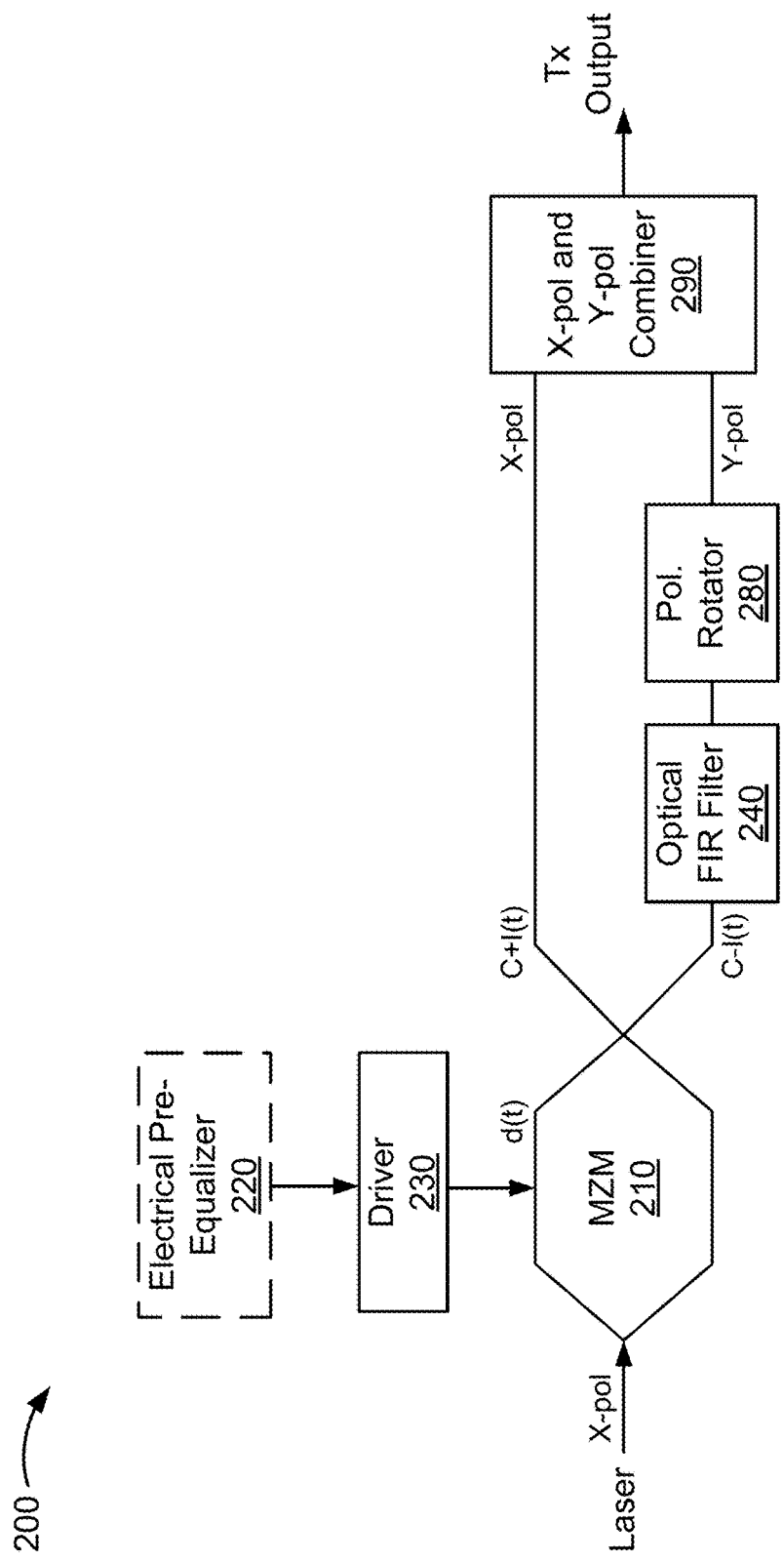
FIG. 2 is a functional block diagram of an improved MZM-based transmitter for direct detection optical communication systems, according to some implementations.

FIG. 2 is a functional block diagram of an improved MZM-based transmitter 200 for direct detection optical communication systems, according to some implementations. The improved transmitter 200 seeks to avoid the loss associated with discarding the complementary-modulated signal by filtering it, rotating it, and recombining the filtered, rotated signal with the (non-complementary) modulated signal. The transmitter 200 includes an MZM 210 modulating a continuous wave laser based on an electrical drive signal from a driver 230. A modulated output from the MZM 210 goes directly to a polarization combiner 290. A complementary-modulated output from the MZM 210 passes through an optical finite impulse response (FIR) filter 240 and a polarization rotator 280 before going into the polarization combiner 290. The polarization combiner 290 combines the signals to yield a transmitter output signal.

The MZM 210, driver 220, and optional electrical pre-equalizer 220 can be similar to the MZM 110, driver 130, and electrical pre-equalizer 120, respectively, used in the conventional direct detection transmitter 100. In contrast with the conventional transmitter 100, however, the improved transmitter 200 does not discard the complementary-modulated output, but rather applies the optical FIR filter 240, rotates the polarization of the signal with the polarization rotator 280, and recombines it with the modulated output of the MZM 210 using the polarization combiner 290. Because there is no fundamental loss introduced by the polarization combiner 290, the optical equalization method of the improved transmitter 200 is in theory a strictly lossless optical equalization technique, although for practical implementation, the polarization combiner 290 may introduce a small (0.1 to 0.2 dB) excess insertion loss. Also because the polarization combiner 290 performs an intensity sum operation, the proposed equalization technique is applicable for direct detection optical communication systems. In some implementations, the polarization rotator 280 and the polarization combiner 290 can be implemented as a single, integrated device.

Figure 3:
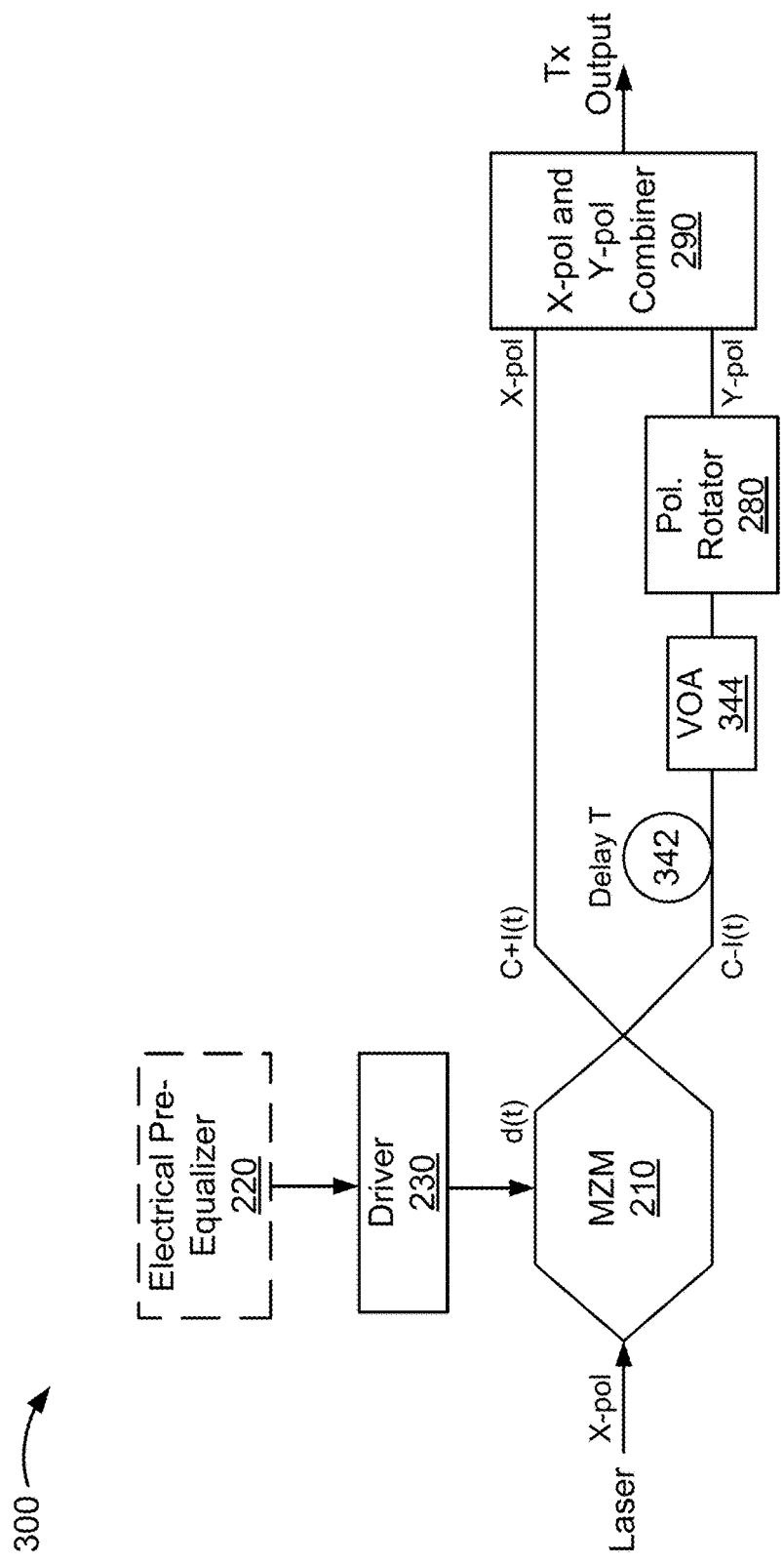
FIG. 3 is a block diagram of a first example of an improved MZM-based transmitter for direct detection optical communication systems, having a one-tap optical finite impulse response filter, according to some implementations.
Figure 4:
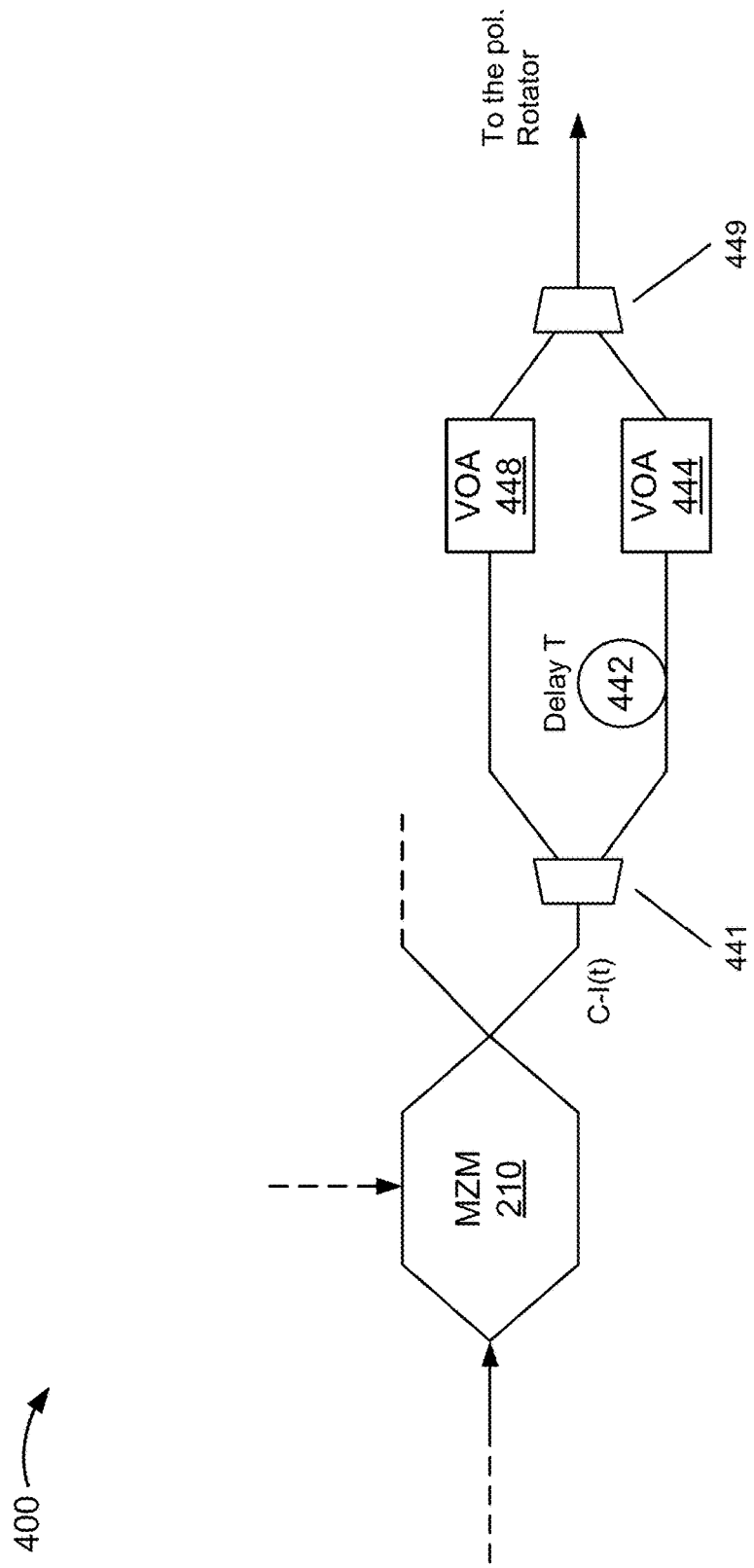
FIG. 4 is a block diagram of a second example of an improved MZM-based transmitter for direct detection optical communication systems, having a two-tap optical finite impulse response filter, according to some implementations.
Figure 5:
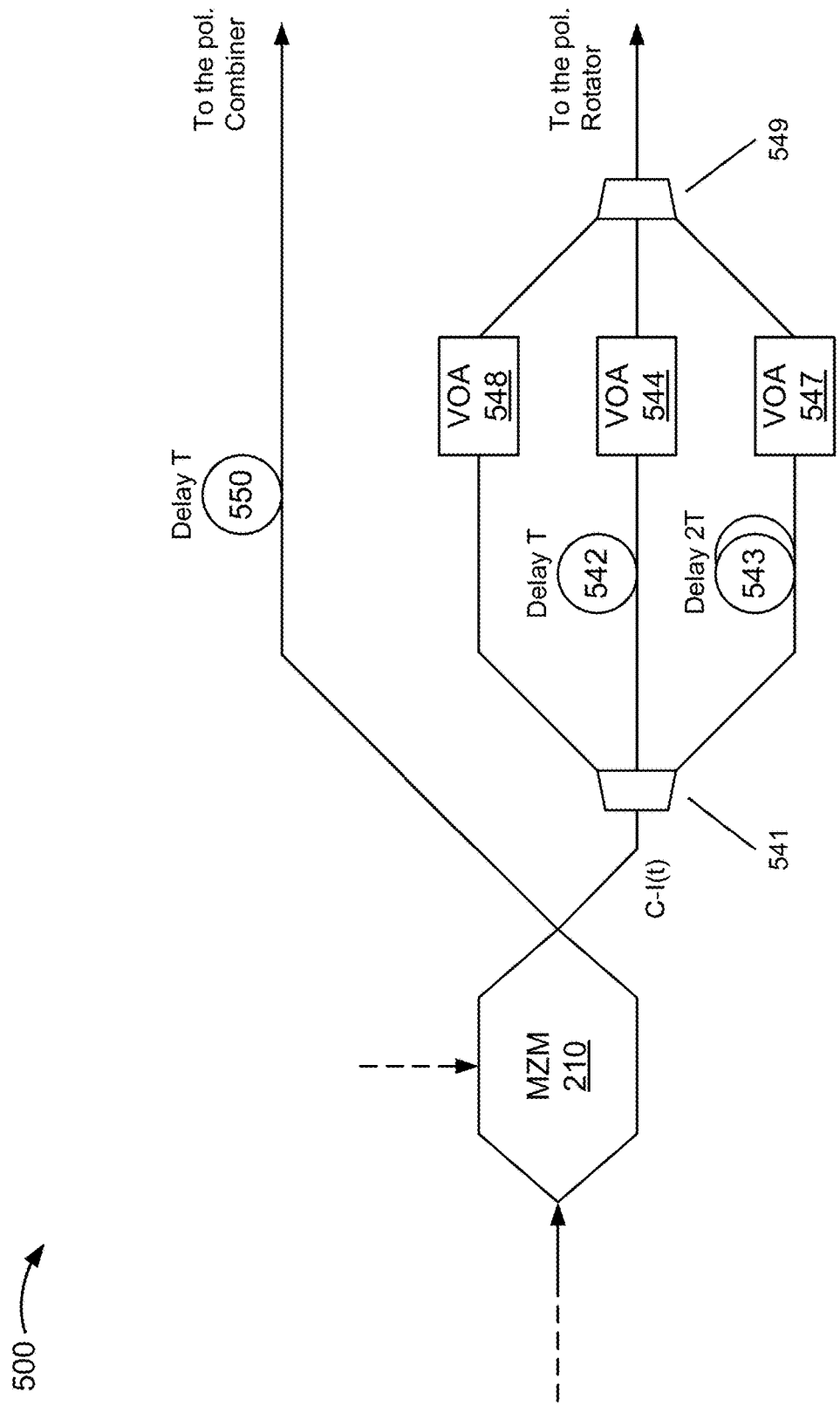
FIG. 5 is a block diagram of a third example of an improved MZM-based transmitter for direct detection optical communication systems, having a three-tap optical finite impulse response filter, according to some implementations.

The optical FIR filter 240 can have various implementations, including one-, two-, and three- tap optical EQ implementations, as shown in FIGS. 3, 4, and 5, respectively.

FIG. 3 is a block diagram of a first example of an improved MZM-based transmitter 300 for direct detection optical communication systems, having a one-tap optical finite impulse response filter, according to some implementations. The transmitter 300 includes a similar MZM 210, optional electrical pre-equalizer 220, driver 230, polarization rotator 280, and polarization combiner 290 as the transmitter 200. The transmitter 300 includes a finite FIR filter implemented as a one-tap, T-spaced optical FIR filter. The filter includes a one-symbol (T-spaced) delay 342 and a variable optical attenuator (VOA) 344, where T denotes a symbol period. The VOA 344 is an optical device that can introduce variable optical loss. The VOA 344 can be implemented as an electrical-absorption modulation-based device or Mach Zehnder interference (MZI)-based device. MZI-based VOA devices may have lower intrinsic loss (in theory lossless) and also can provide an additional optical power monitoring port to help VOA loss control. Because the required power to control the VOA can be very low (less than 2 mW with silicon photonics based devices), the proposed optical equalization technique can have much lower power consumption than the conventional electrical equalization technique (up to and exceeding an order of magnitude lower). A simulation of a transmitter having a one-tap optical EQ similar to the transmitter 300 is shown in graph 903 of FIG. 9B, discussed further below.

FIG. 4 is a block diagram of a second example of an improved MZM-based transmitter 400 for direct detection optical communication systems, having a two-tap optical finite impulse response filter, according to some implementations. The transmitter 400 includes a similar MZM 210, optional electrical pre-equalizer 220, driver 230, polarization rotator 280, and polarization combiner 290 as the transmitter 200, but all but the MZM 210 have been omitted from the drawing for the sake of simplicity. The transmitter 400 includes a finite FIR filter implemented as a two-tap, T-spaced optical FIR filter. The filter includes an optical splitter 441 to split the signal into two signals, and an optical coupler 449 to recombine the signals. Of the split signal, one half is fed directly into a VOA 448 before reaching the optical coupler 449. The second half of the split signal feeds a one-symbol (T-spaced, where T denotes a symbol period) delay 442 and a variable optical attenuator (VOA) 444 before reaching the optical coupler 449. A simulation of a transmitter having a two-tap optical EQ similar to the transmitter 400 is shown in graph 905 of FIG. 9C, discussed further below. Note that the VOA 448 and the coupler 441 may be combined into a single MZI implementation, and the VOA 444 and the coupler 449 may also be combined into a single MZI implementation. Further move, for some implementations, a phase shifter may be introduced in one of the two paths: the upper path with VOA 448 or the lower path with VOA 444 to refine the equalization performance.

FIG. 5 is a block diagram of a third example of an improved MZM-based transmitter 500 for direct detection optical communication systems, having a three-tap optical finite impulse response filter, according to some implementations. The transmitter 500 includes a similar MZM 210, optional electrical pre-equalizer 220, driver 230, polarization rotator 280, and polarization combiner 290 as the transmitter 200, but all but the MZM 210 have been omitted from the drawing for the sake of simplicity. The transmitter 500 includes a finite FIR filter implemented as a three-tap, T-spaced optical FIR filter. The filter includes an optical splitter 541 to split the signal in to three signals, and an optical coupler 549 to recombine the signals. Of the three split signals, one is fed directly into a VOA 548 before reaching the optical coupler 549. The second split signal feeds a one-symbol (T-spaced, where T denotes a symbol period) delay 542 and a variable optical attenuator (VOA) 544 before reaching the optical coupler 549. And the third split signal feeds a two-symbol (2T-spaced) delay 543 and a variable optical attenuator (VOA) 547 before reaching the optical coupler 549. In the transmitter, the modulated output of the MZM 210 is passed through a one-symbol delay 550. The delayed modulated output is combined with the output of the optical coupler 549 to generate the transmitter output.

Figure 6:
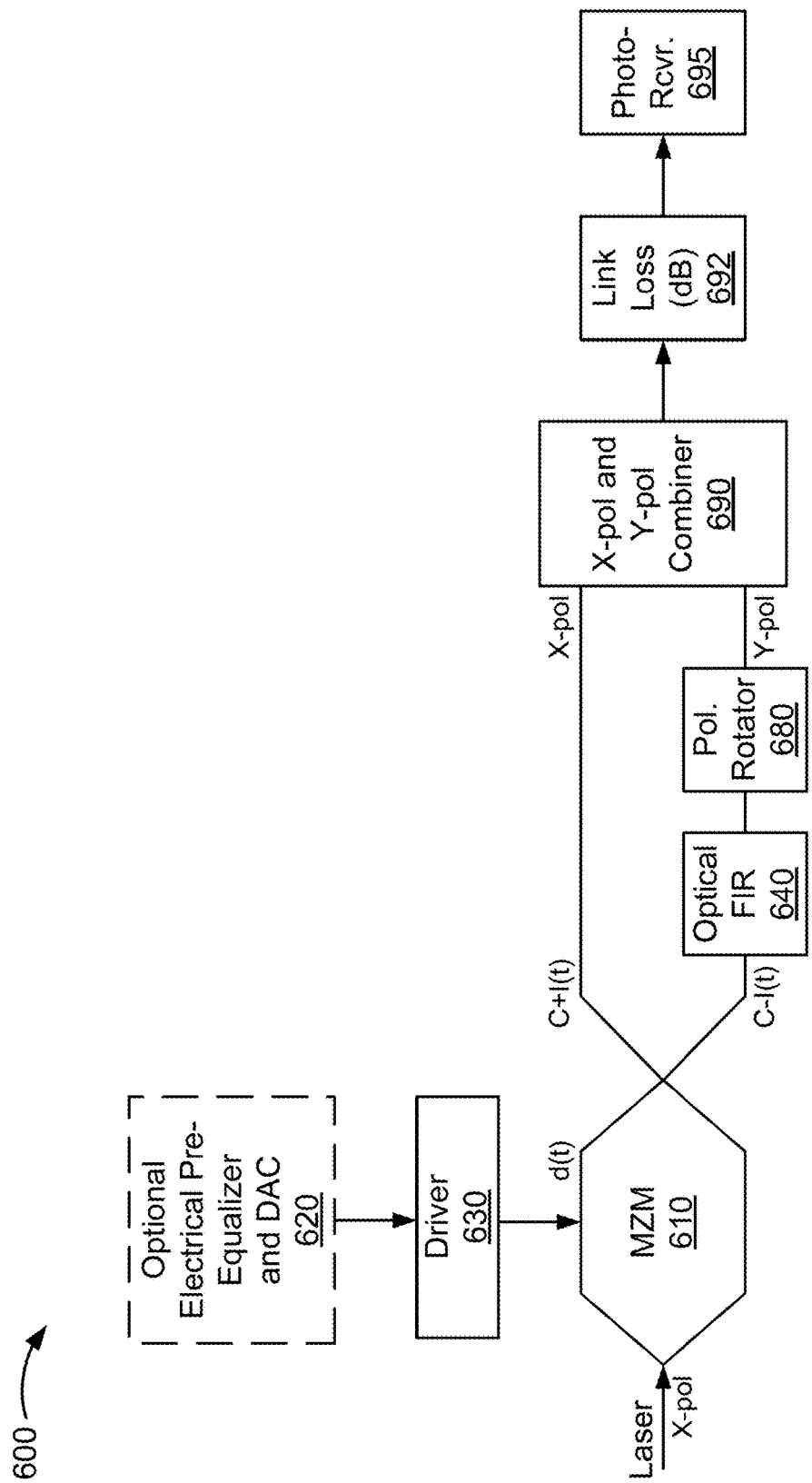
FIG. 6 is a functional block diagram of a high-level end-to-end transmission performance evaluation model of an improved MZM-based transmitter for direct detection optical communication systems.

FIG. 6 is a functional block diagram of a high-level end-to-end transmission performance evaluation model 600 of an improved MZM-based transmitter for direct detection optical communication systems. The MZM 610, optional electrical pre-equalizer 620, driver 630, polarization rotator 680, and polarization combiner 690 of the performance evaluation model 600 are modeled to behave in a manner similar to the MZM 210, optional electrical pre-equalizer 220, driver 230, polarization rotator 280, and polarization combiner 290 of the transmitter 200. The performance evaluation model 600 further includes a link loss element 692, and direct detection photo-receiver 695. In the performance evaluation model 600, link loss can include both the transmit coupling loss and the receive coupling loss. The photo-receiver 695 can include a photodiode (PD), transimpedance amplifier (TIA), analog-to-digital convertor (ADC), and an equalizer. For the performance evaluation model 600, the laser is assumed to be a 11 dBm continuous-wave laser entering into the MZM 610, with a 4 dB MZM insertion loss. The excess insertion loss from the non-ideal X- and Y-polarization combiner is neglected. The performance evaluation model 600 was used to generate the results shown in FIGS. 7 through 10.

Figure 7A:
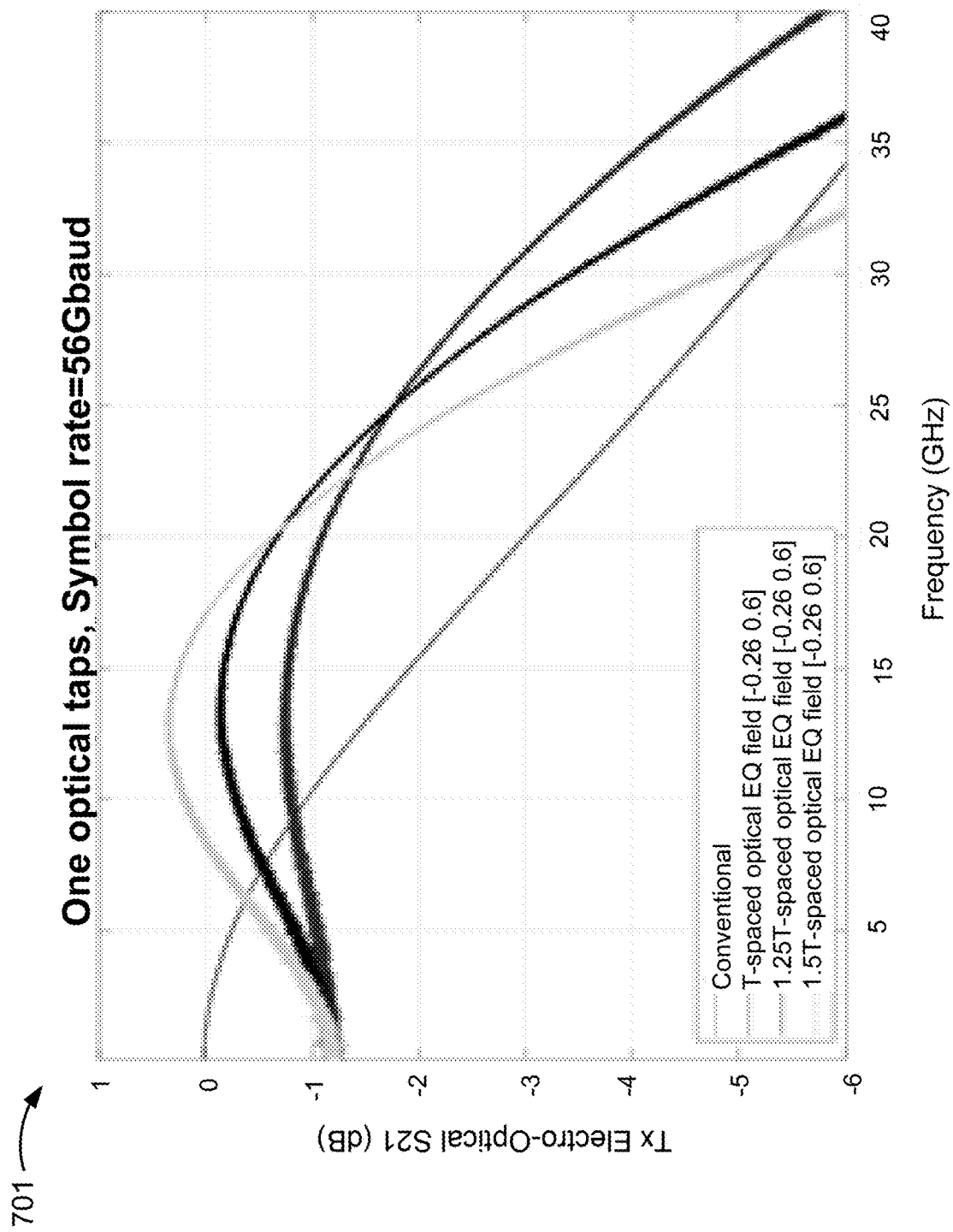
FIGS. 7A and 7B show simulation results comparing insertion loss (S21) between a conventional transmitter and an improved transmitter according to the present disclosure.
Figure 7B:
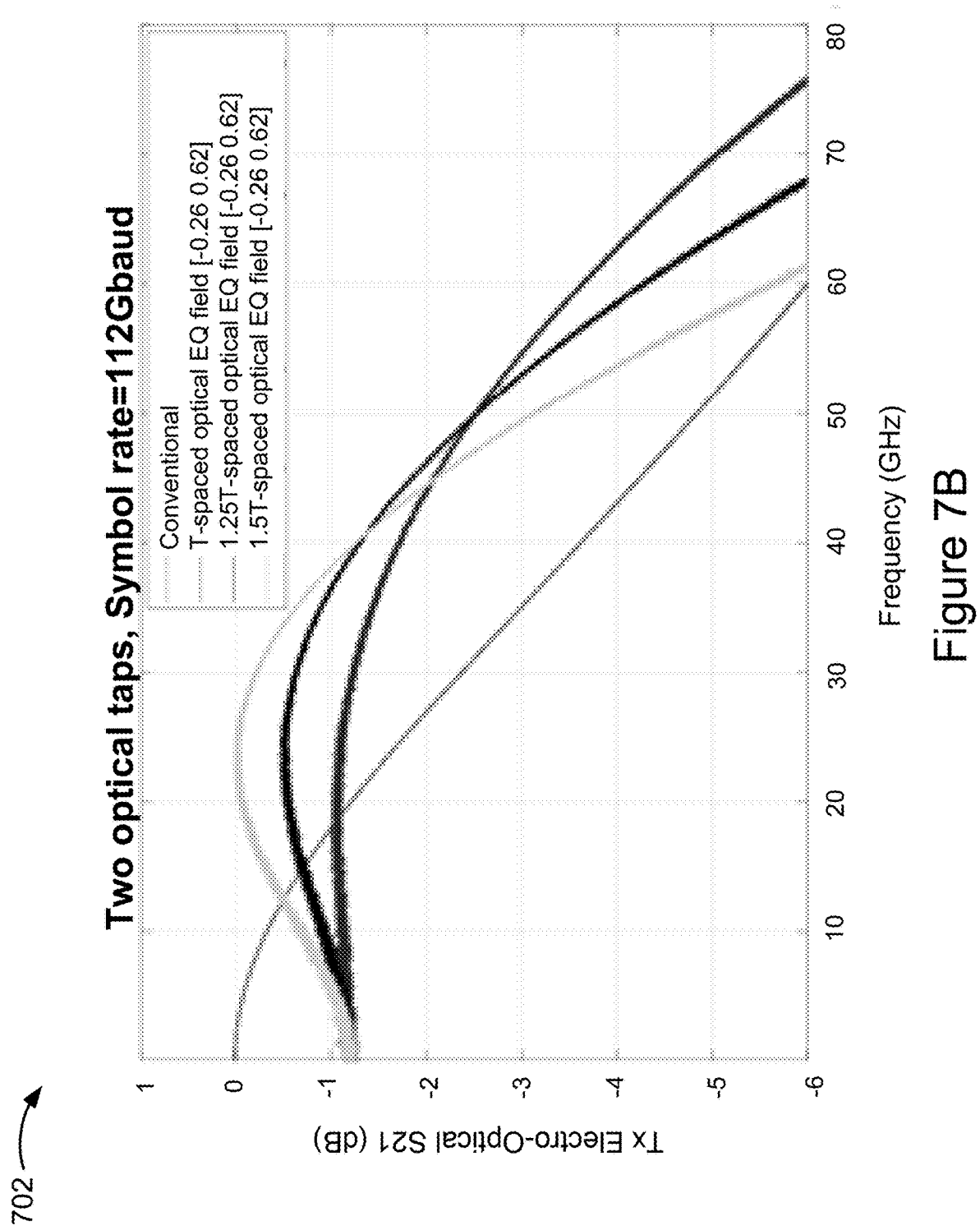

FIGS. 7A and 7B show simulation results 701 and 702, respectively, comparing insertion loss (S21) between a conventional transmitter and an improved transmitter according to the present disclosure. The simulation result 701 shows S21 for a one-tap filter. The simulation result 702 shows S21 for a two-tap filter. The simulation results 701 and 702 show the simulated transmitter side electro-optical transfer function S21 (electrical drive signal as the input and the modulated optical signal to the link as the output) with and without using the proposed bandwidth enhancement technique. A first-order Butterworth filter is used to model the MZM band-limiting effects. With the use of two-tap T-spaced optical equalization technique (such as the transmitter 400 shown in FIG. 4) and assuming a filter tap (power) coefficients a0=0.067 and a1=0.38, the 3-dB electrical-optical bandwidth can be increased from 20 GHz to 35 GHz for a 56 Gbaud system, a 75% bandwidth enhancement; and from 35 GHz to 62 GHz for a 112 Gbaud system, a 77% bandwidth enhancement. Such a bandwidth enhancement is achieved with <1.2 dB loss for the low-frequency signal frequency components (within 10 GHz for a 56 Gbaud system and within 20 GHz for a 112 Gbaud system).

Figure 8A:
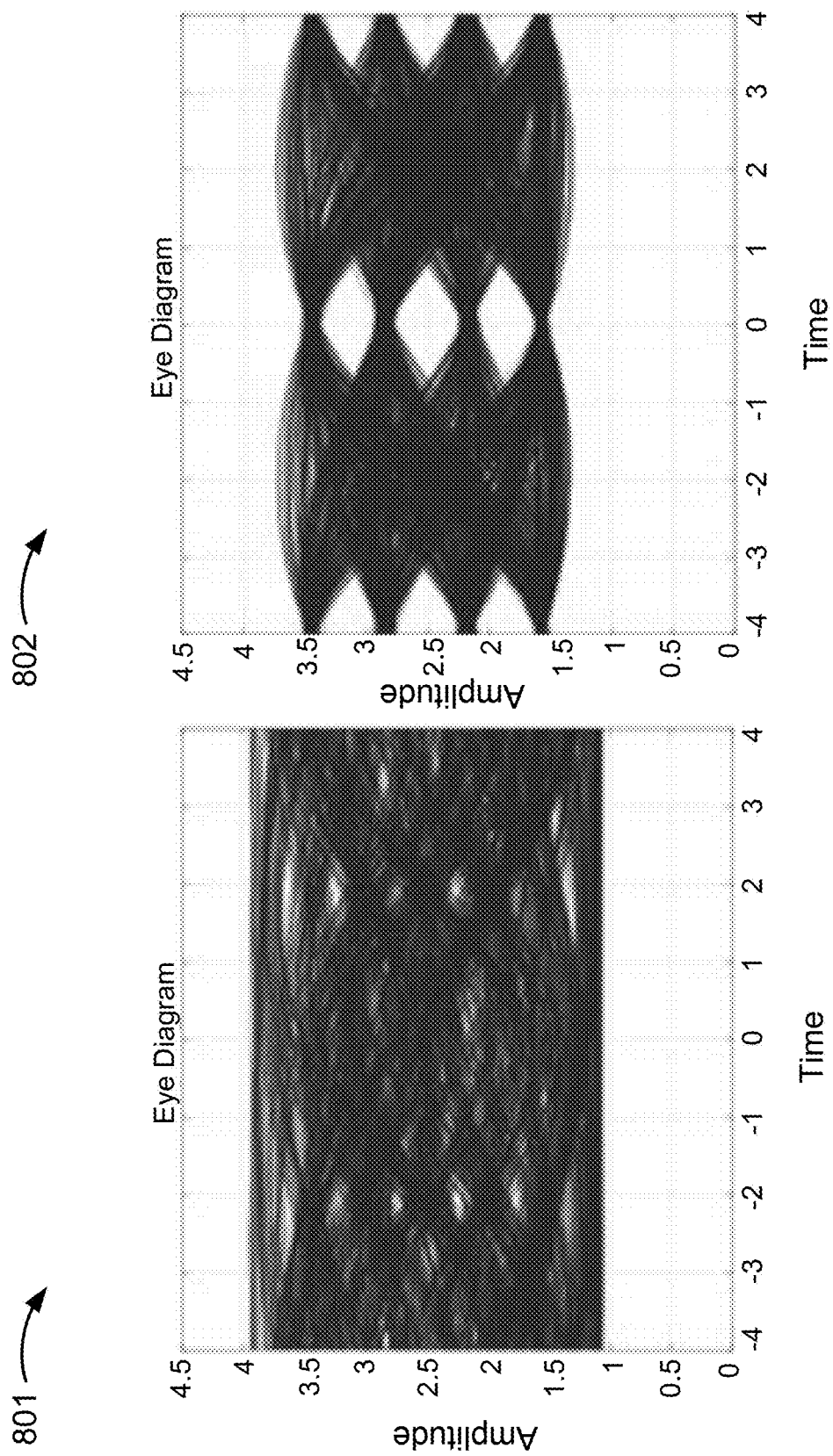
FIGS. 8A and 8B show simulation results comparing output optical eye diagrams between transmitters with no equalization, electrical equalization, and optical equalization according to the present disclosure, respectively.
Figure 8B:
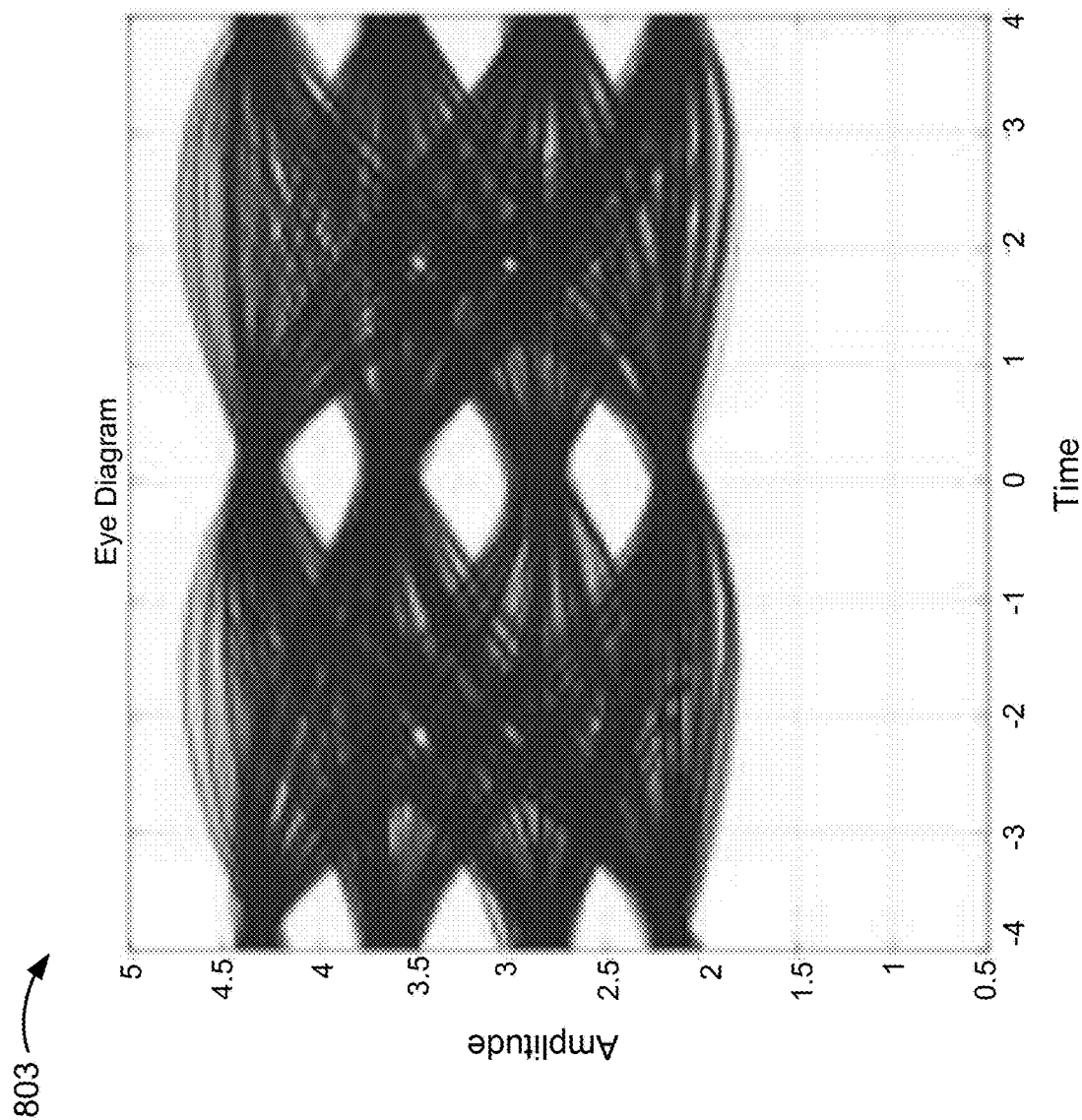

FIGS. 8A and 8B show simulation results 801, 802, and 803 comparing output optical eye diagrams between transmitters with no equalization (801), electrical equalization (802), and optical equalization (803) according to the present disclosure, respectively. FIGS. 8A and 8B show a simulated 56 Gbaud PAM4 Tx output optical eye diagram under three different Tx equalization scenarios: 801 no Tx equalization, 802 with three-tap Tx electrical pre-equalization, and 803 with the proposed three-tap Tx optical equalization, such as accomplished using a transmitter configured similarly to the transmitter 500 of FIG. 5. For this simulation, the 3-dB MZM bandwidth is assumed to be 20 GHz, and the DAC and the driver bandwidth are both assumed to be 30 GHz (assuming 5th order Bessel filter shape). The peak-to-peak electrical drive swing is assumed to be 0.4 Vpi of the MZM. Without using Tx equalization, the optical eye is completely closed due to severe intersymbol interference (ISI). The peak to peak ER (denoted as ERpp hereafter) is 5.76 dB while the rms optical modulation amplitude (OMA) is 0.75 mW. Electrical pre-equalization with FIR filter coefficients [−0.2 1 −0.2] largely removes the ISI, but the ERpp is reduced from 5.76 dB to 4.6 dB, and the rms OMA is reduced from 0.75 mW to 0.65 mW. The proposed 3-tap optical equalization technique with FIR tap (optical field) coefficients [0.36, −0.2, 0.36]) allows effective ISI mitigation without degrading the rms OMA, although the ERpp is reduced to 4.3 dB due to the increased DC components.

Figure 9A:
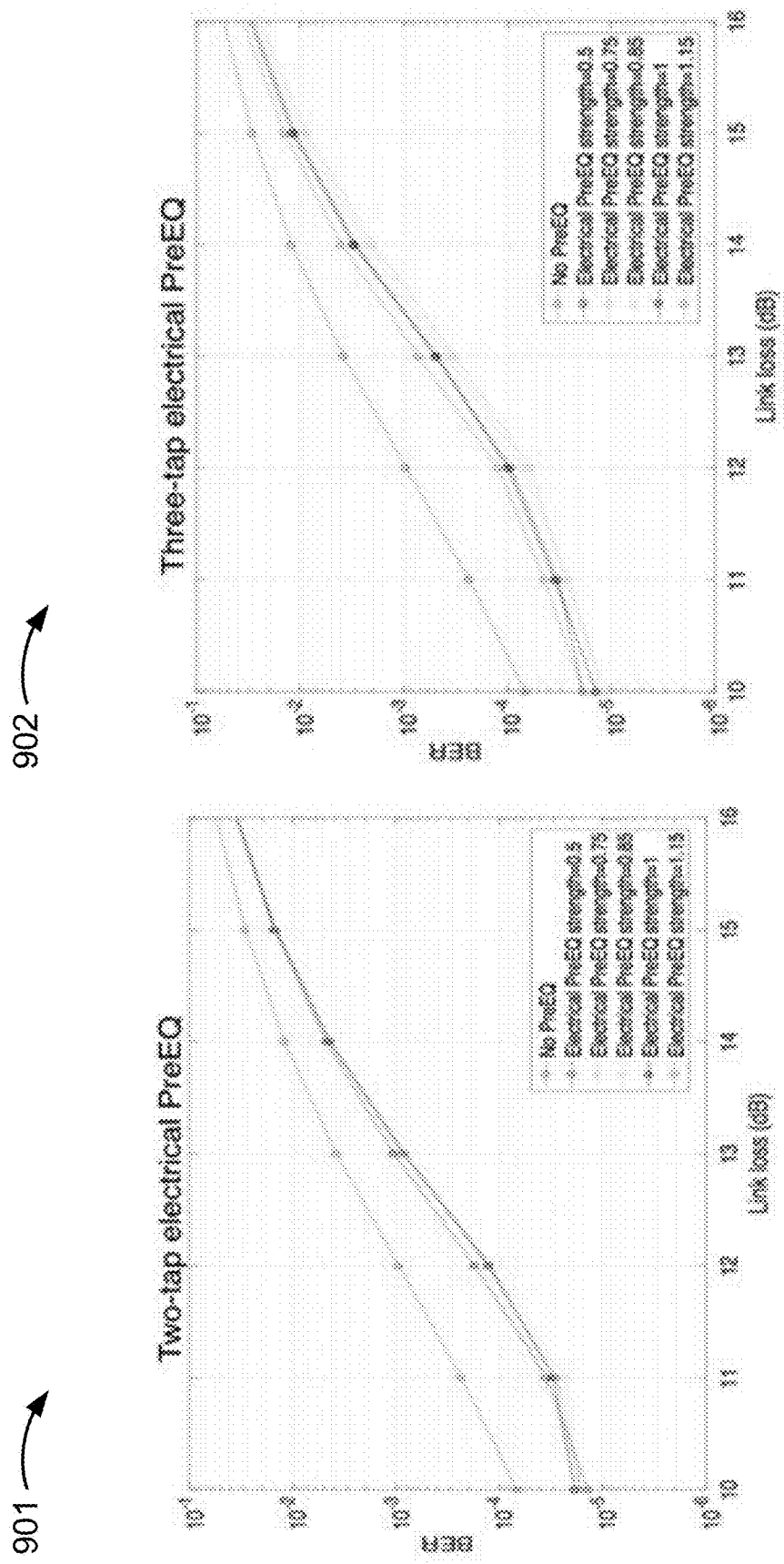
FIGS. 9A-9C show simulated results of end-to-end system performance using different transmitter equalization configurations.
Figure 9B:
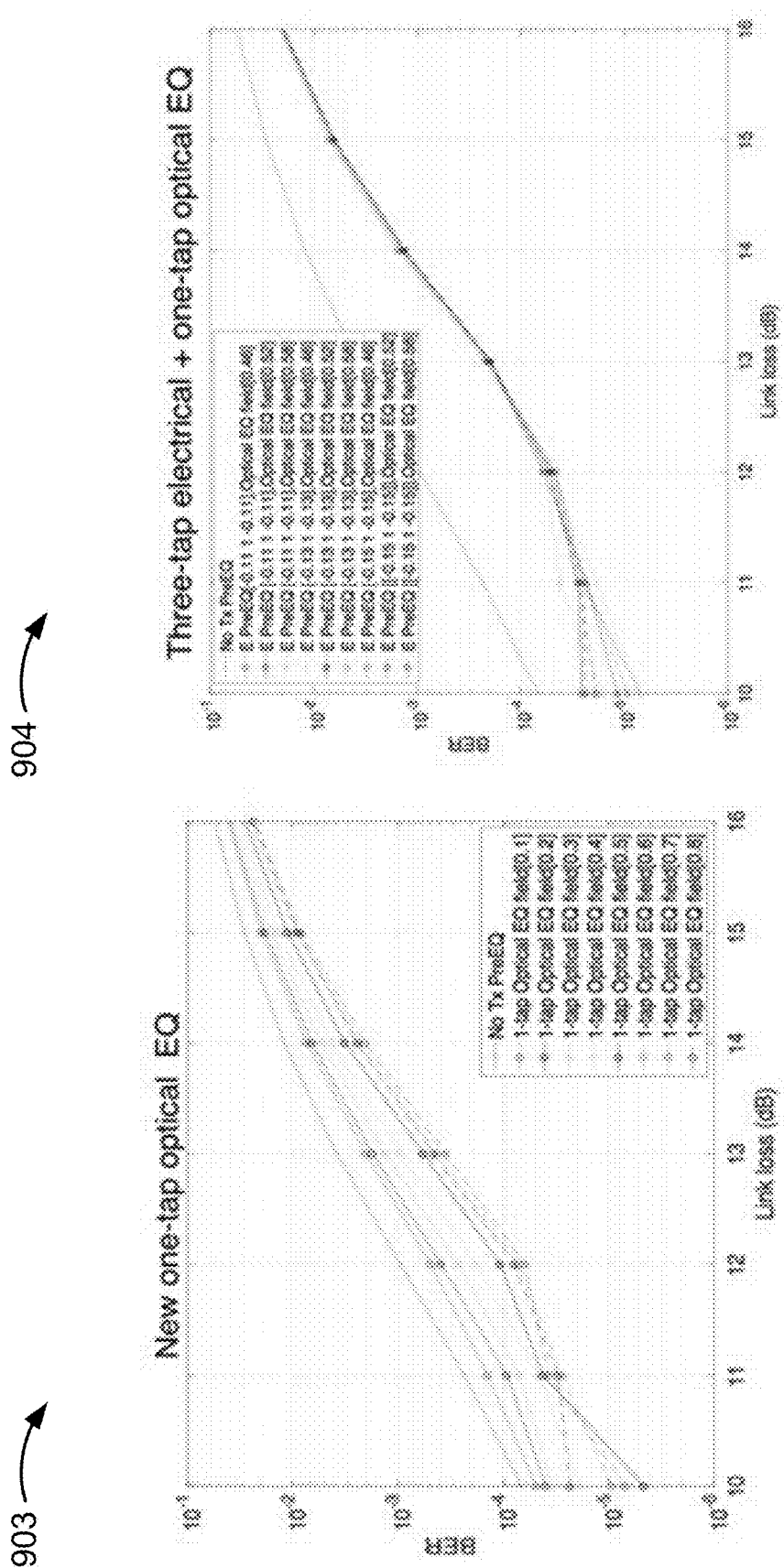
Figure 9C:
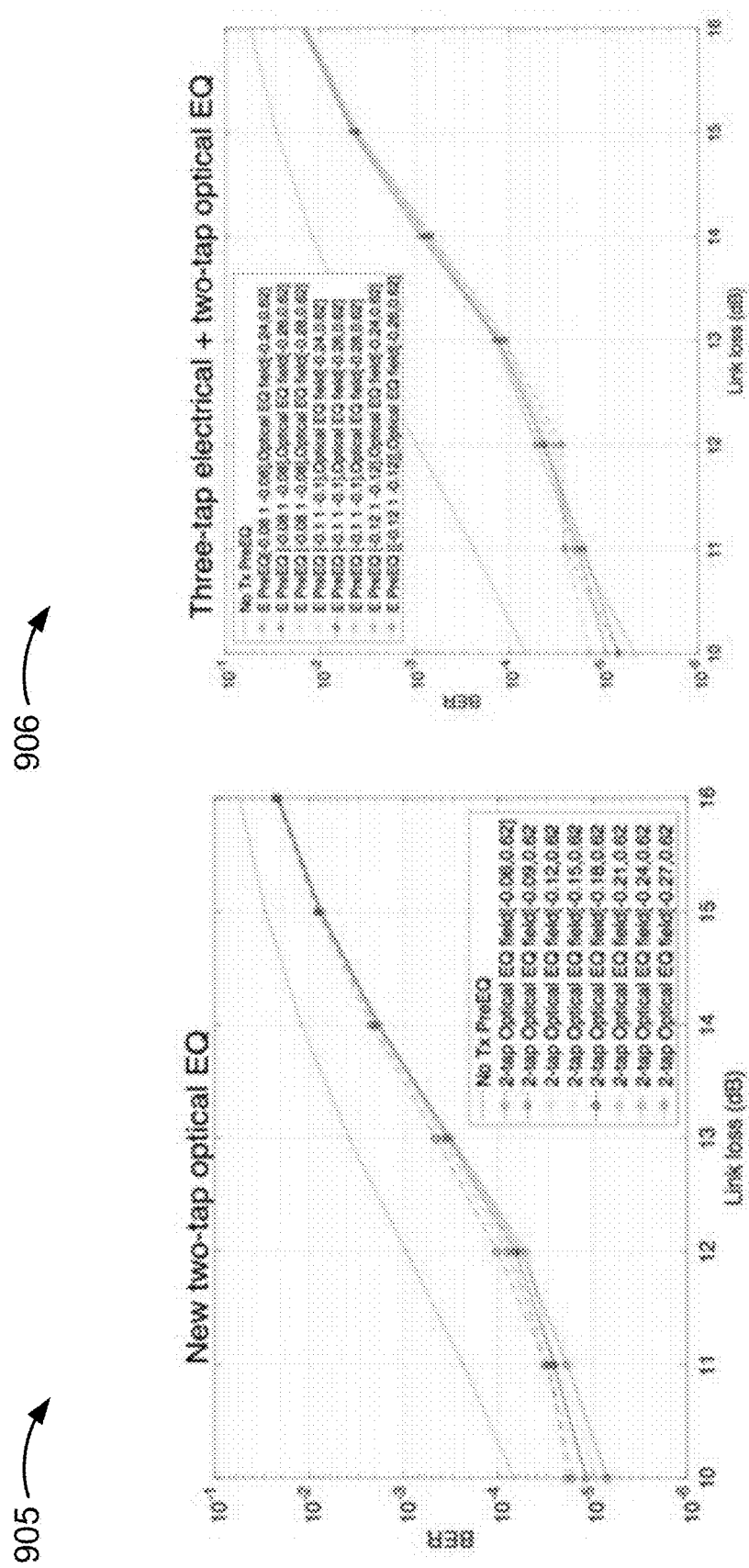
Figure 10:
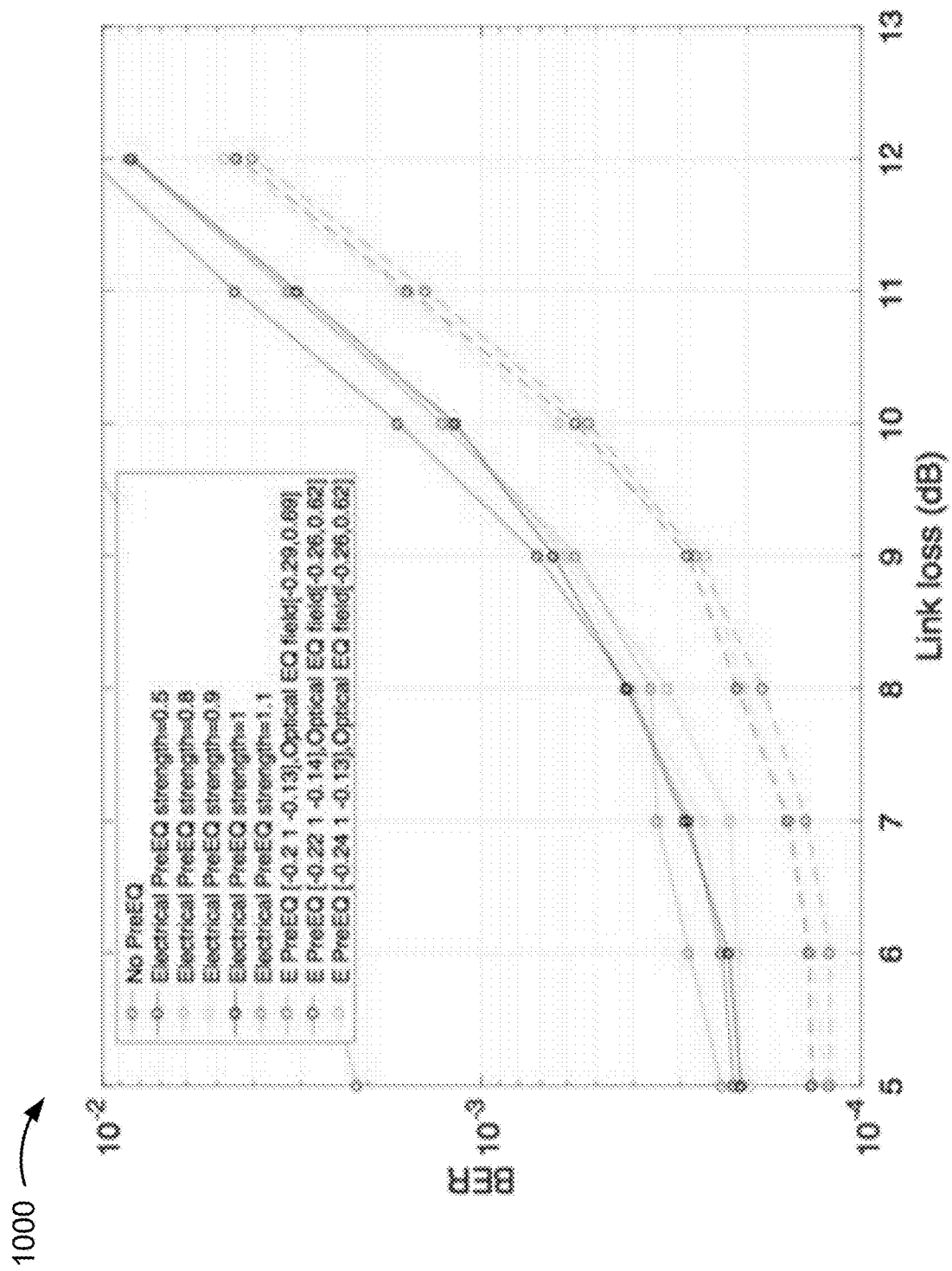
FIG. 10 shows simulated results of end-to-end system performance using several different transmitter equalization configurations and parameters.

FIGS. 9A-9C show simulated results 901-906 of end-to-end system performance using different transmitter equalization methods. Simulated results 901-906 show the simulated 56 Gbaud PAM4 end-to-end system performance using different Tx side equalization methods: (901) with two-tap electrical pre-equalization, (902) with three-tap electrical pre-equalization, (903) with one-tap optical equalization, (904) with joint three-tap electrical and one-tap optical equalization, (905) with two-tap optical equalization, and (906) with joint three-tap electrical and two-tap optical equalization. In this simulation, the MZM 3-dB bandwidth is assumed to be 20 GHz. For other components (DAC, driver, PD, TIA and ADC), the 3-dB bandwidth is assumed to be 30 GHz. A 5th order Bessel filter is used to model the DAC, the driver and the ADC, while a 2rd order Bessel filter is used to model the PD and a 4th order Butterworth filter is used to model the TIA. For the electrical pre-equalization, the preEQ strength=1 denotes the case that all transmitter side band-limiting effects from the DAC, driver and MZM are fully (to the first order) pre-equalized. Fixed seventeen tap T-spaced FFE is used for Rx side post-transmission equalization. From the simulated results 901-906, one can see that the proposed one-tap optical equalization technique can achieve similar performance as the conventional three-tap electrical pre-equalization technique, and can achieve 0.5 dB (in terms of power sensitivity at 1e−3 and 1e−4) better performance than the conventional two-tap electrical pre-equalization technique. Although further increasing optical tap from one to two does not improve the performance by using optical equalization only, about 0.8 dB further performance gain can be achieved by using joint three-tap electrical and two-tap optical equalization (as compared to purely electrical pre-equalization), while only about 0.3 dB additional performance gain is achieved by using joint 3-tap electrical and one-tap optical equalization, FIG. 10 shows simulated results 1001 of end-to-end system performance using several different transmitter equalization methods and parameters. The simulated results 1001 show the simulated 112 Gbaud PAM4 end-to-end system performance using two different Tx equalization methods: three-tap electrical pre-equalization and joint three-tap electrical and two-tap optical equalization. For this simulation, the 3 dB MZM bandwidth is assumed to be 35 GHz, and 50 GHz bandwidth is assumed for all other components. The simulated results 1001 show that the introduction of two-tap optical equalization (in combination of the use of three-tap electrical pre-equalization) can improve about 1 dB power sensitivity at 1e−3 and >1.5 dB power sensitivity at 2e−4 (as compared to the case using only three-tap electrical pre-equalization).

In summary:

The proposed new optical equalization technique can enhance the transmitter bandwidth by >70% without reducing OMA.

For a bandlimited 56 Gbaud PAM4 system, the proposed one-tap optical equalization technique can achieve similar performance as the conventional three-tap electrical pre-equalization technique, and can achieve 0.5 dB better power sensitivity than the conventional two-tap electrical pre-equalization technique For a bandlimited 112 Gbaud PAM4 system (35 GHz MZM bandwidth and 50 GHz other components bandwidth), the proposed two-tap optical equalization in combination of conventional three-tap electrical pre-equalization enables >1.5 dB @ 1e−4 power sensitivity gain.

Figure 11:
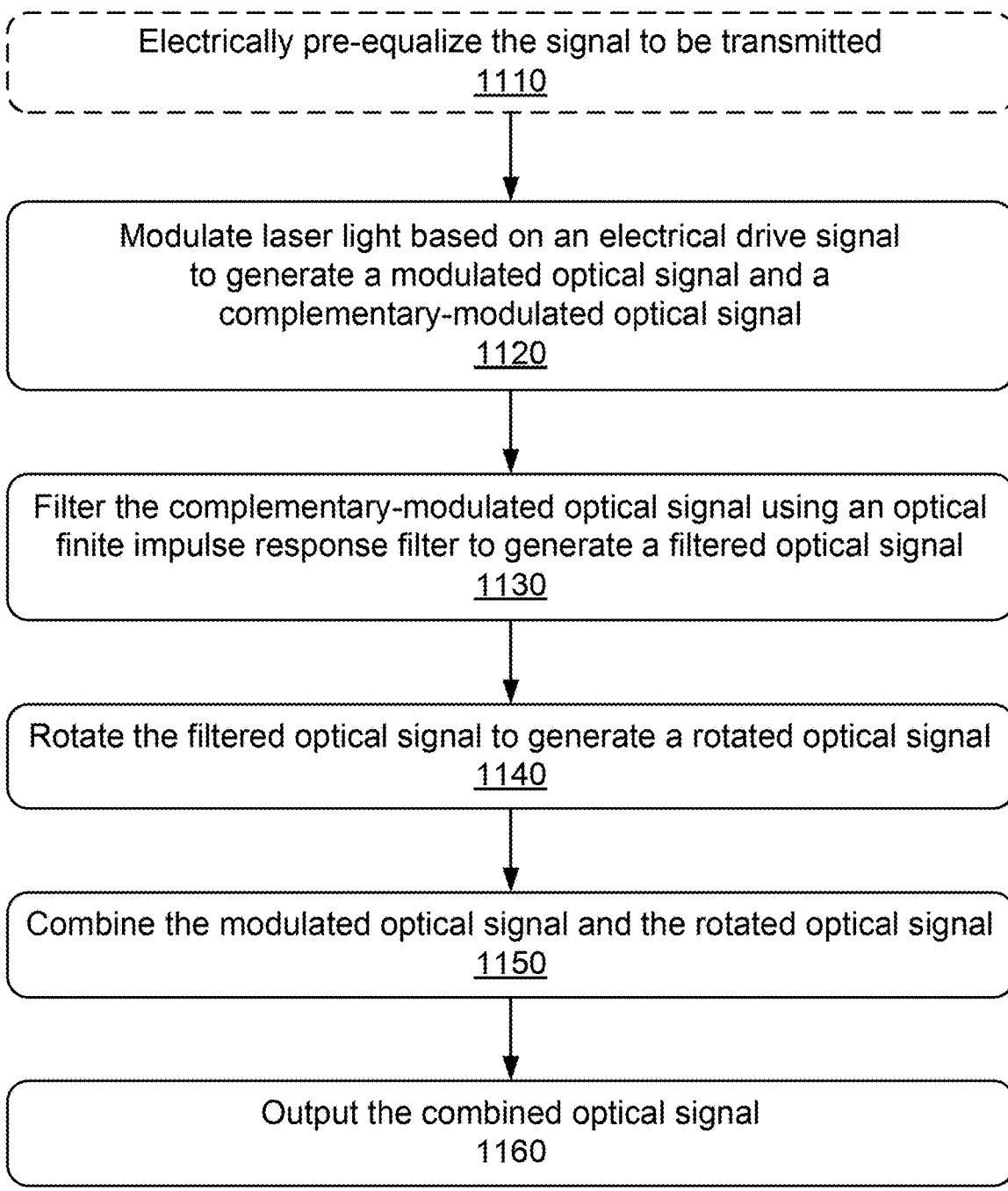
FIG. 11 shows a flowchart of an example method of performing improved MZM-based signal transmission for direct detection optical communication systems, according to some implementations.

FIG. 11 shows a flowchart of an example method 1100 of performing improved MZM-based signal transmission for direct detection optical communication systems, according to some implementations. The method 1100 can be performed by any of the improved transmitters 200, 300, 400, or 500 previously described. The method 1100 can optionally include electrically pre-equalizing the signal to be transmitted (optional stage 1110). The method 1100 includes modulating laser light based on an electrical drive signal to generate a modulated optical signal and a complementary-modulated optical signal (stage 1120). The method 1100 includes filtering the complementary-modulated optical signal using an optical finite impulse response (FIR) filter to generate a filtered optical signal (stage 1130). The method 1100 includes rotating the filtered optical signal to generate a rotated optical signal (stage 1140). The method 1100 includes combining the modulated optical signal and the rotated optical signal (stage 1150). The method 1100 includes outputting the combined optical signal (stage 1160).

The method 1100 can optionally include electrically pre-equalizing the signal to be transmitted (optional stage 1110). In implementations employing electrical pre-equalization, the electrical pre-equalization can be accomplished with an electrical pre-equalizer 220 as previously described. Electrical pre-equalization can consist of amplifying a high-frequency component of an electrical signal to be modulated. Although electrical pre-equalization is optional to operation of the system, it can further improve the performance of the system when used in conjunction with the optical equalization techniques described herein.

The method 1100 includes modulating laser light based on an electrical drive signal to generate a modulated optical signal and a complementary-modulated optical signal (stage 1120). The modulation can be accomplished with a Mach-Zehnder modulator (MZM), such as the MZM 210 previously described. The MZM can modulate a continuous-wave laser according to an electrical signal amplified by a driver, such as the driver 230. The driver can amplify the voltage and/or current of the electrical signal to be modulated to a range suitable for operation of the MZM. The MZM will output two complementary optical signals: the modulated optical signal and a complementary-modulated optical signal.

The method 1100 includes filtering the complementary-modulated optical signal using an optical finite impulse response (FIR) filter to generate a filtered optical signal (stage 1130). The modulated optical can be provided directly to a polarization combiner (or, in some implementations, such as those illustrated by the transmitter 500 shown in FIG. 5, provided to the polarization combiner via a symbol-period delay). The complimentary-modulated optical signal is provided to an optical FIR filter, such as the optical FIR filter 240 described with reference to FIG. 2. As shown by the example transmitters 300, 400, and 500, the optical FIR filter can have a one-, two-, or three-tap configuration, respectively.

For a one-tap design, the method 1100 can include delaying the complementary-modulated optical signal by a symbol period using a symbol-period delay, and attenuating the delayed complementary-modulated optical signal with a variable optical attenuator (VOA), such as the VOA 344, to generate the filtered optical signal. The VOA can be an electrical-absorption modulation based device or a Mach Zehnder interference based device. The filtered optical signal can be provided to the polarization rotator.

For a two-tap design, the method 1100 can include splitting the complementary-modulated optical signal into a first signal and a second signal using an optical coupler, such as the optical splitter 441 described with reference to FIG. 4. The first signal can be attenuated with a VOA to generate a first attenuated signal. The second signal can be delayed by a symbol period using a symbol-period delay. The second signal can be attenuated by a VOA to generate a second attenuated signal. The method 1100 can include combining the first attenuated signal and the second attenuated signal to generate the filtered optical signal. The filtered optical signal can be provided to the polarization rotator.

For a three-tap design, the method 1100 can include splitting the complementary-modulated optical signal into a first signal, a second signal, and a third signal using an optical coupler. The first signal can be attenuated using a VOA to generate a first attenuated signal. The second signal can be delayed by a symbol period and attenuated to generate a second attenuated signal. The third signal can be delayed by two symbol periods, and attenuated to generate a third attenuated signal. The first attenuated signal, the second attenuated signal, and the third attenuated signal can be combined using an optical coupler, such as the optical coupler 549, to generate the filtered optical signal. The filtered optical signal can be provided to the polarization rotator, which can provide the rotated optical signal to the polarization combiner. Meanwhile, the modulated optical signal—from the modulated (i.e., non-complementary) output of the MZM—can be delayed with a symbol period delay prior to combing with the rotated optical signal. The delayed modulated optical signal can be provided to the polarization combiner, which can combine the delayed modulated optical signal with the rotated optical signal to generate the combined optical signal for transmission.

The method 1100 includes rotating the filtered optical signal to generate a rotated optical signal (stage 1140). Rotating the optical filtered optical signal can be accomplished using the polarization rotator 280 previously described. The polarization rotator can rotate the filtered optical signal by 90 degrees.

The method 1100 includes combining the modulated optical signal and the rotated optical signal (stage 1150). A polarization combiner, such as the polarization combiner 290 described with reference to FIG. 2 can combine the rotated optical signal and the modulated optical signal from the MZM. In some implementations, such as in the three-tap optical filter implementations, the modulated optical signal from the MZM may be delayed by a symbol period prior to being recombined with the rotated optical signal at the polarization combiner.

The method 1100 includes outputting the combined optical signal (stage 1160). The recombined optical signal can be output from the transmitter as a direct detection optical signal.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A direct detection optical transmitter comprising:
   a Mach Zehnder Modulator (MZM) configured to modulate laser light based on an electrical drive signal to generate a modulated optical signal and a complementary-modulated optical signal;
   an optical finite impulse response (FIR) filter configured to receive the complementary-modulated optical signal from the MZM and generate a filtered optical signal;
   a polarization rotator configured to receive the filtered optical signal from the FIR and output a rotated optical signal;
   an optical combiner configured to combine the modulated optical signal from the MZM and the rotated optical signal from the polarization rotator; and
   an output port configured to output the combined optical signal.

2. The direct detection optical transmitter of claim 1, wherein the optical FIR filter includes a single-tap delay-and-attenuation filter.

3. The direct detection optical transmitter of claim 2, wherein the optical FIR filter includes:
   a symbol period delay; and
   a variable optical attenuator.

4. The direct detection optical transmitter of claim 3, wherein the variable optical attenuator is one of an electrical-absorption modulation based device or a Mach Zehnder interference based device.

5. The direct detection optical transmitter of claim 1, wherein the FIR filter includes a two-tap filter.

6. The direct detection optical transmitter of claim 5, wherein the optical FIR filter includes:
   a first optical coupler configured to split the complementary-modulated optical signal into a first signal and a second signal;
   a first variable optical attenuator configured to receive the first signal and output a first attenuated signal;
   a symbol period delay configured to delay the second signal;
   a second variable optical attenuator configured to receive the delayed second signal and output a second attenuated signal; and
   a second optical coupler configured to combine the first attenuated signal and the second attenuated signal and provide the filtered optical signal to the polarization rotator.

7. The direct detection optical transmitter of claim 1, wherein the FIR filter includes a three-tap filter.

8. The direct detection optical transmitter of claim 7, comprising a first symbol period delay configured to delay the modulated optical signal before reaching the optical combiner, wherein the optical FIR filter includes:
   a first optical coupler configured to split the complementary-modulated optical signal into a first signal, a second signal, and a third signal;
   a first variable optical attenuator configured to receive the first signal and output a first attenuated signal;
   a second symbol period delay configured to delay the second signal;
   a second variable optical attenuator configured to receive the delayed second signal and output a second attenuated signal;
   a two symbol period delay configured to delay the second signal;
   a third variable optical attenuator configured to receive the delayed third signal and output a third attenuated signal; and
   a second optical coupler configured to combine the first attenuated signal, the second attenuated signal, and the third attenuated signal and provide the filtered optical signal to the polarization rotator.

9. The direct detection optical transmitter of claim 1, comprising:
   an electrical pre-equalizer configured to electrically pre-equalize an electrical signal for transmission;

an electrical drive configured to receive the electrical signal and provide the electrical drive signal to the MZM.

10. The direct detection optical transmitter of claim 9, wherein electrical pre-equalizer includes a three-tap electrical pre-equalizer.

11. A method of transmitting a direct detection optical signal, the method comprising:
    modulating, using a modulator, laser light based on an electrical drive signal to generate a modulated optical signal and a complementary-modulated optical signal;
    filtering the complementary-modulated optical signal from the modulator using an optical finite impulse response (FIR) filter to generate a filtered optical signal;
    rotating, using a rotator, the filtered optical signal from the FIR to generate a rotated optical signal;
    combining the modulated optical signal from the modulator and the rotated optical signal from the rotator; and
    outputting the combined optical signal.

12. The method of claim 11, wherein the optical FIR filter includes a single-tap delay-and-attenuation filter.

13. The method of claim 12, wherein filtering the complementary-modulated optical signal comprises:
    delaying the complementary-modulated optical signal by a symbol period; and
    attenuating the delayed complementary-modulated optical signal to generate the filtered optical signal.

14. The method of claim 13, comprising attenuating the delayed complementary-modulated optical signal using one of an electrical-absorption modulation based device or a Mach Zehnder interference based device.

15. The method of claim 11, wherein the FIR filter includes a two-tap filter.

16. The method of claim 15, wherein filtering the complementary-modulated optical signal comprises:
    splitting the complementary-modulated optical signal into a first signal and a second signal;
    attenuating the first signal to generate a first attenuated signal;
    delaying the second signal by a symbol period;
    attenuating the delayed second signal to generate a second attenuated signal; and
    combining the first attenuated signal and the second attenuated signal to generate the filtered optical signal.

17. The method of claim 11, wherein the FIR filter includes a three-tap filter.

18. The method of claim 17, comprising:
    splitting the complementary-modulated optical signal into a first signal, a second signal, and a third signal;
    attenuating the first signal to generate a first attenuated signal;
    delaying the second signal by a symbol period;
    attenuating the delayed second signal to generate a second attenuated signal;
    delaying the third signal by two symbol periods;
    attenuating the delayed third signal to generate a third attenuated signal; and
    combining the first attenuated signal, the second attenuated signal, and the third attenuated signal to generate the filtered optical signal; and
    delaying the modulated optical signal with a symbol period delay prior to combing with the rotated optical signal.

19. The method of claim 11, comprising:
    electrically pre-equalizing an electrical signal for transmission;
    amplifying the pre-equalized electrical signal to generate the electrical drive signal; and
    providing the electrical drive signal to the MZM.

20. The method of claim 19, wherein electrical pre-equalizer is a three-tap electrical pre-equalizer.

* * * * *